United States Patent
Subramaniyan et al.

(10) Patent No.: US 10,854,092 B1
(45) Date of Patent: Dec. 1, 2020

(54) METHOD AND SYSTEM TO IMPROVE THE SITUATIONAL AWARENESS OF ALL AERODROME GROUND OPERATIONS INCLUDING ALL TURNAROUND AIRPORT COLLABORATIVE DECISION MAKING (A-CDM) MILESTONES IN THE COCKPIT

(71) Applicant: HONEYWELL INTERNATIONAL INC., Morris Plains, NJ (US)

(72) Inventors: Muthusankar Subramaniyan, Chennai (IN); Sivakumar Kanagarajan, Madurai (IN); Visvanathan Thanigai Nathan, Bangalore (IN); Kiran Gopala Krishna, Bangalore (IN); Mohammed Ibrahim Mohideen, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/577,708

(22) Filed: Sep. 20, 2019

(51) Int. Cl.
*G08G 5/00* (2006.01)

(52) U.S. Cl.
CPC .......... *G08G 5/003* (2013.01); *G08G 5/0021* (2013.01)

(58) Field of Classification Search
CPC ....... H04W 84/18; H04W 4/02; H04W 4/024; H04W 4/029; H04W 4/90; H04W 76/50; H04W 64/00; G01C 21/3415; G01C 21/3461; G01C 21/3697; G01C 23/005; G01C 21/00; G01C 21/20; G01C 23/00; G08G 1/096716; G08G 1/096741; G08G 1/096791; G08G 1/205; G08G 5/0021; G08G 5/0039; G08G 5/025; G08G 1/20; G08G 1/202; G08G 5/00; G08G 5/0013; G08G 5/0056; G08G 5/0065; H04L 65/1069; G06F 9/46; G06F 9/5038; G06F 9/54; G06K 2009/00738; G06K 9/00744;
(Continued)

(56) References Cited

U.S. PATENT DOCUMENTS 6,049,754 A   4/2000   Beaton et al.
7,363,119 B2   4/2008   Griffin, III et al.
(Continued)

FOREIGN PATENT DOCUMENTS

AU     2013205740     1/2013
CN     205770207      12/2016
(Continued)

*Primary Examiner* — Daniel Previl
(74) *Attorney, Agent, or Firm* — Lorenz & Kopf, LLP

(57) ABSTRACT

A method and system for time-based viewing to coordinate airport collaborative decision making (A-CDM) events between a pilot and ground personnel on a cockpit display of an aircraft of generating a time scale with a list of A-CDM events of the aircraft during inbound, turnaround and outbound flight operations to an airport based sensor data contributed by aircraft systems and data of A-CDM event related to airport operations to generate a current time moving window in the time scale for identifying A-CDM events; generating a graphic user interface using the sensor data for positioning the current time moving window on the time scale; and collaboratively communicating with ground personnel decisions based on an aircraft state and a current A-CDM event identified by the positioning of the current time moving window in the time scale to expedite completion of a particular A-CDM event.

20 Claims, 8 Drawing Sheets

(58) Field of Classification Search
CPC .............. G06K 9/00771; G06K 9/6256; G06K
9/6262; G06K 9/6878; G06K 9/00201;
G06K 9/00369; G06K 9/00832; G06K
9/209; G06K 9/522; G06K 9/6292; G06K
9/6293; G06K 9/00362; G06K 9/00657;
G06K 9/4614; G06N 20/00; G06N 5/04;
G06Q 10/103; G06Q 10/02; G06Q
10/047; H04N 21/41407; H04N
21/43637; H04N 21/4402; H04N
21/4516; H04N 2013/0081; H04N
2013/0092; H04N 21/2146; H04N 7/24;
B64C 13/34; B64C 25/426; B64C 27/14;
B64C 9/12; B64C 2201/12; B64C
2201/122; B64C 2201/123; B64C
29/0025; B64C 39/024; B64D 27/24;
B64D 35/02; B64D 43/00; B64D 45/08;
B64D 1/16; B64F 1/04; B64F 1/18; G01S
11/08; G01S 13/10; G01S 13/70; G01S
13/913; G01S 13/933; G01S 17/95; G01S
1/02; G01S 7/06; G01S 7/20; G01S
7/282; G01W 1/04; G05D 1/0676; G05D
1/0083; G05D 1/0094; G05D 1/104;
G06T 2207/10021; G06T 2207/20064;
G06T 2207/30268; G06T 7/97; G06T
11/60; G06T 5/006; G07C 5/008; G07C
5/085; G07C 5/0891; H02K 11/33; H02K
16/00; H02K 21/14; H02K 21/24; H02K
2213/06; H02K 2213/12; Y02T 50/32;
Y02T 50/44; Y02T 50/64; Y02T 50/82;
A01B 79/005; B60R 21/01538; B60R
21/01542; G01N 21/538; G01P 15/135;
G04R 20/00; G06G 7/70; G09B 9/40;
G09B 9/46; G09B 9/54; H01Q 13/00;
H01Q 3/06; H02J 50/20; H02J 50/80;
H02J 7/025; Y02A 90/19
USPC ................ 340/945, 946–948, 963, 971–973,
340/992–995.11, 427, 438–439, 525,
340/539.22, 588
See application file for complete search history.

(56) References Cited

U.S. PATENT DOCUMENTS

| | | | |
|---|---|---|---|
| 7,765,061 | B1 | 7/2010 | Barber et al. |
| 8,014,675 | B2 * | 9/2011 | Sarashina ............. H04J 14/005 |
| | | | 398/72 |
| 8,082,070 | B2 | 12/2011 | Gunn et al. |
| 8,099,201 | B1 | 1/2012 | Barber et al. |
| 8,290,643 | B2 | 10/2012 | Chen et al. |
| 8,756,012 | B2 * | 6/2014 | He ........................ G08G 5/0021 |
| | | | 701/527 |
| 9,032,319 | B1 | 5/2015 | Hammack et al. |
| 9,202,381 | B2 | 12/2015 | Aymeric et al. |
| 9,245,242 | B2 | 1/2016 | Arnold et al. |
| 9,292,159 | B2 | 3/2016 | Le Roux et al. |
| 9,335,917 | B2 | 5/2016 | Dostal et al. |
| 9,593,961 | B2 | 3/2017 | Ramaiah et al. |
| 9,725,162 | B2 | 8/2017 | Cox et al. |
| 9,934,693 | B2 | 4/2018 | Joyson et al. |
| 2005/0090969 | A1 | 4/2005 | Siok et al. |
| 2008/0177432 | A1 * | 7/2008 | Deker ................. G05D 1/0676 |
| | | | 701/17 |
| 2010/0063716 | A1 | 3/2010 | Brozat |
| 2010/0153875 | A1 | 6/2010 | O'Flynn et al. |
| 2010/0274417 | A1 | 10/2010 | Perbet et al. |
| 2011/0246002 | A1 | 10/2011 | Shavit |
| 2014/0156114 | A1 | 6/2014 | Aymeric et al. |
| 2014/0156115 | A1 | 6/2014 | Aymeric et al. |
| 2015/0348422 | A1 | 12/2015 | Agrawal et al. |
| 2015/0355832 | A1 * | 12/2015 | Dostal ................. G08G 5/0021 |
| | | | 715/771 |
| 2017/0158345 | A1 | 6/2017 | Saez et al. |
| 2018/0016034 | A1 * | 1/2018 | Joyson ............. G06Q 10/06315 |
| 2020/0027363 | A1 * | 1/2020 | Vana ..................... G01S 17/931 |

FOREIGN PATENT DOCUMENTS

| | | |
|---|---|---|
| FR | 2984486 | 6/2013 |
| JP | 2010105899 | 5/2010 |

* cited by examiner

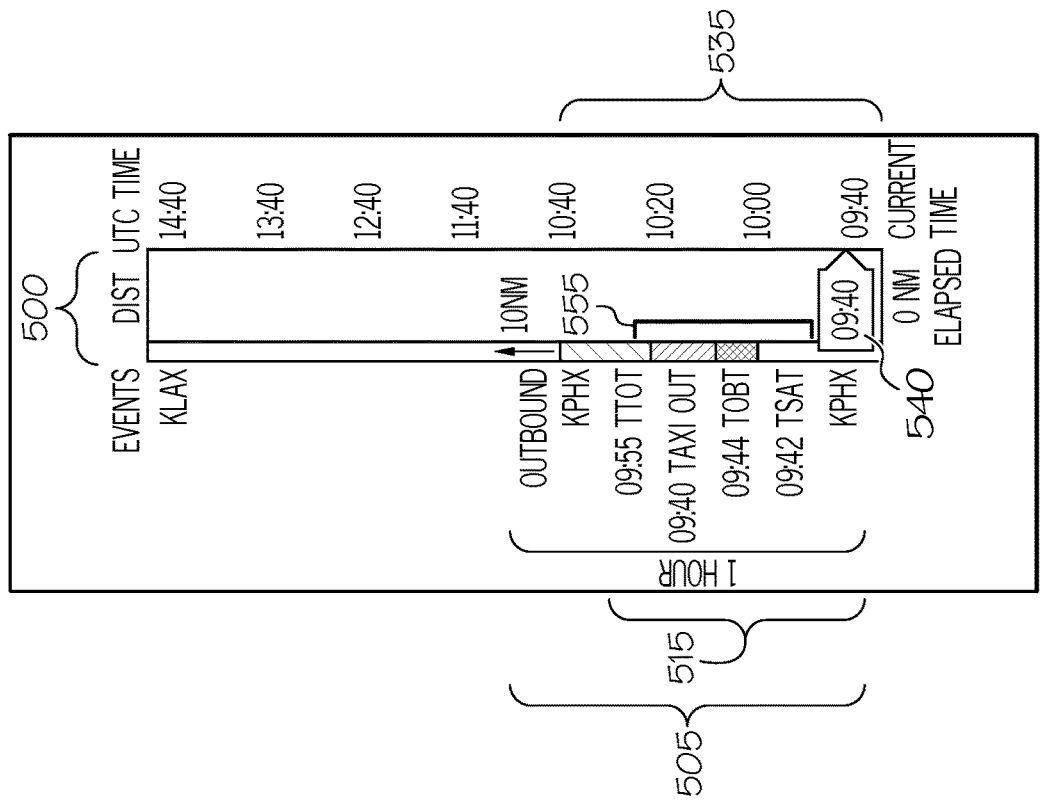
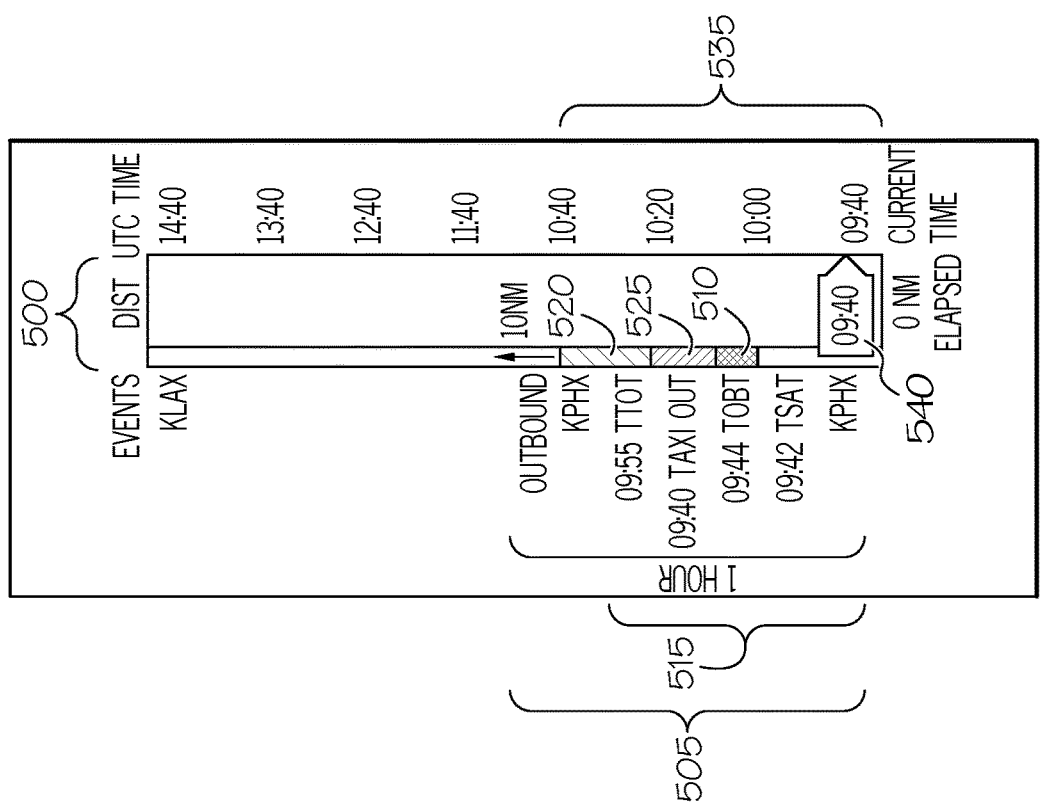
FIG. 5A
FIG. 5B

US 10,854,092 B1

METHOD AND SYSTEM TO IMPROVE THE SITUATIONAL AWARENESS OF ALL AERODROME GROUND OPERATIONS INCLUDING ALL TURNAROUND AIRPORT COLLABORATIVE DECISION MAKING (A-CDM) MILESTONES IN THE COCKPIT

TECHNICAL FIELD

Embodiments of the subject matter described herein relate generally to methods, and systems for managing air traffic by airport collaborative decision-making (A-CDM) event operations, and more particularly, embodiments of the subject matter relate to expediting decision making communications between ground personnel and the pilot about A-CDM events by using a graphic user interface of a time scale with a current time moving window for displaying in a cockpit display A-CDM events in gate-to-gate flight operations.

BACKGROUND

On-demand aviation once thought to be unattainable in the near future is now considered a viable mode of transportation with the potential to improve urban mobility, by enabling a network of small, electric aircraft that take off and land vertically known as VTOL (Vertical Take-off and Landing) aircrafts for alternate modes of reliable transportation between cities and suburbs within cities. The implementation of the single pilot cockpit operations can play an integral role in not only future modes of transportation but can also have applicability to current aviation operations by providing cost savings and enhanced efficiencies. There still remains a number of hurdles towards fully implementing single pilot cockpit operations. Among them, are necessary ways for communicating collaborative decision making in the cockpit between the cockpit personnel and the ground personnel.

That is, during various flight phases, there are numerous activities that the pilot must coordinate at the airport for departure and for arrival. These are known as Airport Collaborative Decision Making (A-CDM) events which can be specific to each airport and the related ground operation events. Some of the tasks like a pushback request, an engine start-up request, and a taxi clearance request must occur on-time and require input from the pilot with coordination by the ATC to reserve a runway slot at a necessary time.

Hence, it is desirable to represent an A-CDM event tailored for a specific aircraft, based on a query, and display the A-CDM event in a time scale to enhance the ground operation decision makings for completing a set of A-CDM events.

It is desirable to improve the pilot's situational awareness in real-time of ground operations by providing a collaborative graphic user interface (GUI) application to monitor, notify and communicate data of A-CDM events to the flight crew and to airport ground personnel during inbound, turn around and outbound flight operations. This can empower a pilot to make key critical decisions of ground operational events faster at the airport and in turn can save costs by reducing the number of missed runway slots, and avoiding penalties for causing delays in the gates thereby likely resulting in performance increases for on-time flight goals.

It is desirable to assist the pilot to perform with enhanced efficiency in the inbound, turn-around, and outbound flight operations of an aircraft by receiving detailed real-time A-CDM event information in a cockpit display in a time scale with a current time moving window and selectable time intervals for predicting, assessing and communicating information about a set of A-CDM events in various flight phases.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method and system for monitoring, assessing, notifying and communication about A-CDM events when approaching, landing, taxiing and departing an airport.

In one exemplary embodiment, a method for time-based viewing to coordinate airport collaborative decision making (A-CDM) events between a pilot and ground personnel on an interface configurable for display on multiple types of cockpit displays of an aircraft is provided. The method includes: generating, using a computing device that has at least one processor programmed to implement an application hosted by the computing device, a time scale with a list of A-CDM events of the aircraft during inbound, turnaround and outbound flight operations to an airport based on a first component of sensor data contributed by aircraft systems and based on a second component of data of A-CDM event related to airport operations wherein the first and second components are used to generate a current time moving window in the time scale for identifying one or more A-CDM events; receiving sensor data to the at least one processor from at least one sensor system deployed on the aircraft; associating a memory to the at least one processor for the storing the list of A-CDM events related to the airport operations; executing, by the at least one processor, the application to generate a graphic user interface using the sensor data for positioning the current time moving window on the time scale for display on a cockpit display; and collaboratively communicating, by communication devices coupled to the at least one processor with ground personnel, decisions based on an aircraft state and a current A-CDM event identified by the positioning of the current time moving window in the time scale to expedite completion of a particular A-CDM event.

In various exemplary embodiments, the method further includes: notifying, by a pop-up of an A-CDM event on the time scale on the cockpit display, an action related to the A-CDM event identified by the positioning of the current time moving window; and notifying, by another pop-up of the A-CDM event of the time scale while in-air of a status change in any upcoming A-CDM events in a flight on the cockpit display. The method, further includes: adjusting a selector knob to change a time interval for viewing the one or more A-CDM events in the time scale by increasing or decreasing the time interval displayed on the cockpit display; and providing, without requiring adjustments to the selector knob, automated interval displays related to predicted future delays in A-CDM events or upcoming A-CDM events in the time scale on the cockpit display.

The method, further includes: adjusting by the selector knob the time scale to a half flight time scale to enable monitoring of a narrow time interval of A-CDM events of an entire flight in the time scale displayed by the graphic user interface. The method, further includes: color coding a segment of the time scale to correspond to an A-CDM event for visual notification on the cockpit display by color of the A-CDM event. The method, further includes: notifying decisions for A-CDM events on the time scale by inputs from the selector knob including: decisions to skip or modify a particular A-CDM event.

In another exemplary embodiment, a system for time-based viewing to coordinate airport collaborative decision making (A-CDM) events between a pilot and ground personnel on an interface configurable for display on multiple types of cockpit displays of an aircraft is provided. The system includes: a source of ground operation data at an airport; a source for A-CDM events for generating a list of A-CDM events; a source of aircraft state data; a source of an active trajectory; a display system configured to generate a graphic user interface (GUI) comprising a time scale configured with a moving time window displaying one or more A-CDM events from a list of A-CDM events; a control module operationally coupled to receive and process the source of ground operation data, the aircraft state data, the active trajectory, and the A-CDM events, and configured to command the display system to display the list of A-CDM events and to continuously update each A-CDM event in the list with current ground operation data related to operation of the aircraft; and a selector knob, responsive to input time interval selections by the pilot, for adjusting the time interval for viewing the one or more A-CDM events by increasing or decreasing the time interval displayed with the moving time window to enable viewing of current A-CDM event information for collaborative decision making communications between the pilot and ground personnel to expedite completion the A-CDM event viewed with the moving time window.

In various exemplary embodiments, the system, further includes: a display of a full flight time scale, by a selection of the selector knob, to enable monitoring of the time interval of A-CDM events for an entire flight with the moving time window in the time scale of the graphic user interface. The moving time window includes an opaque background to contrast with a display of the time scale. The system, further includes: a display of a half flight time scale, by a selection of the selector knob, to enable monitoring of a lesser time interval of A-CDM events of an entire flight with the moving time window. The moving time window includes a white background to contrast with a display of the time scale. The half time scale selected as the time interval is configurable in the graphic user interface while a remaining part of the time scale is configured with remaining flight hours. The system, further includes: a segment of the time scale color coded to correspond to a particular A-CDM event for visual notification by color of the A-CDM event in the time scale.

In yet another embodiment, a method for time-based viewing to coordinate airport collaborative decision making (A-CDM) events between a pilot and ground personnel on a cockpit display of an aircraft is provided. The method includes: receiving ground operation data at an airport; receiving A-CDM event data for generating a list of A-CDM events; receiving aircraft state data; receiving active trajectory about the aircraft; processing by a control module operationally coupled and configured for receiving the ground operation data, the aircraft state data, the active trajectory, and the A-CDM event data to display a time scale containing a list of A-CDM events in a cockpit display and to continuously update each A-CDM event in the time scale with current ground operation data related to operation of the aircraft; generating a graphic user interface (GUI) to display the time scale configured with a moving time window presenting one or more A-CDM events from the list of A-CDM events in the cockpit display; and adjusting a time interval of the time scale by a selector knob for viewing the one or more A-CDM events by increasing or decreasing the time interval with the moving time window to identify a particular A-CDM event in the list for collaborative decision making communications between the pilot and ground personnel about the A-CDM event to expedite a set of task at least including: completing, skipping or modifying the A-CDM event for enhance efficiency in the operation of the aircraft.

In various exemplary embodiments, the method further includes: displaying a full flight time scale, by a selection of the selector knob, to enable monitoring of all of the A-CDM events for an entire flight with the moving time window in the time scale of the graphic user interface. The method further includes: notifying, by a pop-up of an A-CDM event on the time scale on the cockpit display, an action related to the A-CDM event identified by the positioning of the current time moving window; and/or notifying, by another pop-up of the A-CDM event of the time scale while in-air of a status change in any upcoming A-CDM events in a flight on the cockpit display wherein the moving time window comprises an opaque background to contrast with a display of the time scale.

The method, further includes: displaying a half flight time scale, by a selection of the selector knob, to enable identifying a limited time interval of A-CDM events of an entire flight by the moving time window in the time scale of the graphic user interface. The moving time window includes a white background to contrast with a display of the time scale. The half time scale selected as the time interval is configurable in the graphic user interface while a remaining part of the time scale is configured with remaining flight hours. The method, further includes: providing, without requiring adjustments to the selector knob, automated interval displays related to predicted future delays in A-CDM events or upcoming A-CDM events in the time scale on the cockpit display; and color coding a segment of the time scale to correspond to the A-CDM event for visual notification by color of the A-CDM event in the time scale.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 5A and 5B illustrate exemplary diagrams of time scales with current time moving windows of graphic user interfaces for comparison of A-CDM events, in accordance with an embodiment;

DETAILED DESCRIPTION

Figure 1:
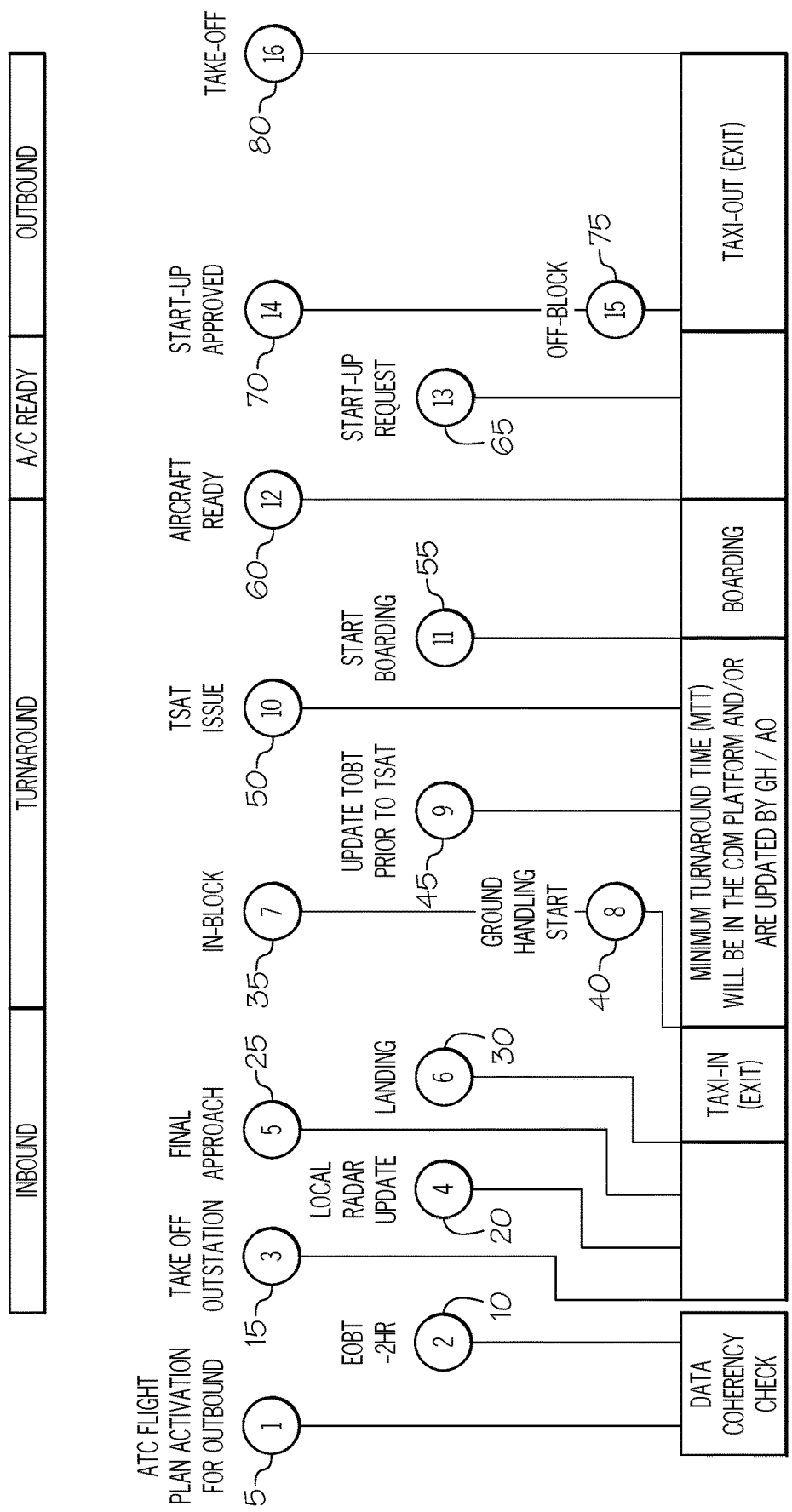
FIG. 1 illustrates an exemplary diagram of an inbound, turnaround, and outbound A-CDM events for the gate to gate flight operations for use in the time scale with the current time moving window of the A-CDM event display assistance system, in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Globally, airports and airspace are becoming increasingly busier, for traditional traffic flows and causing capacity constraints at airports. It is becoming evident that the current traffic loads because of limitations in airport capacity cannot be sustained without logistically problems even at the current traffic levels, let alone at future increased traffic levels which with little doubt will result in significant increases of flight delays, unless appropriate action is taken such as the implementation of more efficient communication systems between pilots and ground personnel.

Recognizing the ever-increasing likelihood of traffic congestion at current levels and more importantly at future higher levels, the Airport Collaborative Decision Making (A-CDM) process was created to address the overall efficiency needs of airport operations by optimizing the use of current resources and improving the predictability of sets of events in inbound, turn around, and outbound operations. With the focus on a set of event milestones for aircraft turn-round, pre-departure and arrival sequencing processes, an increase in predictability can be gained which can result in benefits for all flight ground operations at major airports and related aircraft network operations. The improved data generated and coordinated through the shared A-CDM event processes between all airline stakeholders has been determined as a means of providing clear, accurate and transparent information, that when delivered can create an end to end communication process connecting the airport to the aircraft in the air and on the ground to reduce delays and providing a seamless and efficient travel experience to the airline customers.

The time-based traffic surface management approach relies on a set of A-CDM events to achieve and complete a set of time-based operations and all these time based operations clustered into events can be made available and predicted in the near future for coordinated collaborative decision making with cockpit personnel for enhanced efficiency in aircraft surface operations leading to improved service level agreement (SLA) and key performance indicator (KPI) adherences by each carrier. There is a need for more coordinated ground operation data to be displayed for pilot decision for overall safety in aircraft ground operations. With this in mind, the airport collaborative decision making (A-CDM) was developed as a joint venture methodology between ACI Europe, EUROCONTROL, International Air Transport Association (IATA) and the Civil Air Navigation Services Organization (CANSO) aiming to improve the operational efficiency of all airport operations by reducing delays, increasing the predictability of events as the flight progresses and optimizing the utilization of local resources.

The A-CDM events methodology was developed for sharing with pilots for enhancing cross communications with ground personnel to allow the pilot to make collaborate decisions with the ground personnel to reduce delays in the airport. For example, the sharing of A-CDM events information can allow the pilot to independently predict Target Off Block Time (TOBT) and the Target Push Back Time (TPBT) which is currently generated by airport server applications (and hence available only for aircraft traffic control) and to interface and insert decisions for the completions of related activities to meet these A-CDM event milestones.

The present disclosure describes a graphical user interface that provides a means for sharing A-CDM events and related data in an application that generates a graphic user interface which includes a time scale with a current time moving window. This provides a cockpit display, notification and cross-communication system for the pilot with ground personnel of inbound, turn around and outbound operations (i.e. ground handling operations) related to A-CDM events for cockpit decision making to expedient completion of each A-CDM event. In addition, the time scale display meets the FAA requirements of providing navigational information deemed highly relevant with the essential flight parameters that are already organized on the PFD. That is, the A-CDM events are displayed in the time scale with the current time moving window in a manner without clutter in the current PFD in use (i.e. the A-CDM events are presented with the PFD in the least intrusive manner) as warranted or selectively requested by the pilot for monitoring each A-CDM to completion.

In various exemplary embodiments, the A-CDM event information can be provided on the HUD displays or in other avionics displays drawing the pilots attention whenever an action or decision is needed to be made, is made or is predicted to be made during an aircraft flight phase on the trajectory planned of a flight for providing situational awareness to the pilot and assists in maintaining a look-up while in a flight mode for safe flight operations. As an example, the pilot can, by relying on the HUD display, have the opportunity to make the necessary flight inputs to safely operate the aircraft in flight while extending his/her viewing to monitoring ground operations and for communicating collaborate decision making. In other words, a minimal look-down of the aircraft instrumentations is all that is required on the part of the pilot with the A-CDM event information made available and presented in the HUD display for the collaborative cross communication happening simultaneously.

Hence, it is desirable to alleviate pilot collaborate decision making responsibilities by providing an apparatus and method that provides an automated methodology for displaying, notifying and communicating about A-CDM events, at appropriate times, to the pilot during the course of a flight and in particular during ground operations at embarkation and arrival destinations.

The present disclosure describes a display, notification and communication A-CDM method and system that uses an application configured with a graphic user interface with a time scale and a current time moving window for receiving A-CDM event data of an actual destination (i.e. aerodrome) real-time event via an application configured for collaborative communication and display assistance that considers all the inputs of data about the aircraft and the airport operations (i.e. aerodrome traffic management) to increase the accuracy of the data received about the A-CDM event and enable decision making in response to real-time presentations of the A-CDM event information in a selectable time scale with a current time moving window of a flight phase.

In various exemplary embodiments, the present disclosure describes a graphical user interface with a time scale of an A-CDM display assistance method and system that provides verifications or checks for notices to identifying condition information of an A-CDM event at embarkation, at and during touchdown, in-air, and at approach/arrival at a destination airport. Also, information provided by the ground controllers about the A-CDM event can be incorporated in the time scale (i.e. displayed in the current time moving window) with data from aircraft sensors for monitoring surrounding of the aircraft to generate a real-time progressive time mapping of A-CDM events in a time scale for viewing in the cockpit of the aircraft that in turn provides more situational awareness to the pilot of the progress to completion of the necessary A-CDM events.

In various exemplary embodiments, the present disclosure describes the use of corrected A-CDM event data that are published and corrected for a particular flight segment which can communicated to the ground (i.e. aerodrome) controllers through a data link or any other aspects based on the pilot's acknowledgment and incorporated in the time scale for display to the pilot. This aids the A-CDM event display assistance system to adhere to any standard operating procedure set by local authorities as well as aids the other aircraft and controllers in the vicinity of the aerodrome to be aware of changes of A-CDM event data.

In various exemplary embodiments, the present disclosure describes systems and methods for multi-platform use of an A-CDM event display assistance application system that uses a graphic user interface with a time scale and a current time moving window for A-CDM event displays that provides verifications or checks by cross communications with the pilot and ground personnel for notices to identifying conditions of an A-CDM events at embarkation, on arrival, on approach, on the ground at destination airports. Also, provided is A-CDM display assistance system configured for displaying alerts or issuing warnings to the flight crew (i.e. the pilot) of A-CDM related event data configured in the time scale with the current time moving window (ex. flight corrections that are applied to the air traffic controller . . . etc.) so that the pilot can make advance corrections or other arrangements to expedite completion of one or more A-CDM events affects and reduce delays.

In various embodiments, the present disclosure describes an A-CDM event display assistance method and system that detects A-CDM events in flight and presents the A-CDM event data on a time scale with a current time moving window to enhance the pilot's situation awareness and to enable cross communications of the pilot and the ATC or ground personnel for collaborative decision making. In addition, the A-CDM event data can be presented on the time scale based on a time and a priority scheme that validates and receives the data as inputs in real time from multiple stakeholders and entities involved in the ground operations.

In various exemplary embodiments, systems and methods are provided to assist with ground operations and related events including all turnaround operations related to A-CDM timestamps from ATC and ground personnel in the cockpit display using a time scale with a current time moving window. For example, the pilot can be designated key decision maker in enabled by the time scale and current time window providing improved situational awareness of A-CDM event data to the pilot for cross communications and decision-making process to achieve or skip a particular A-CDM event thereby preventing flight delays.

In various exemplary embodiments, the display of contextual based A-CDM events to cockpit display can provide options for pilot to see the critical time to seek for A-CDM event data about A-CDM events such as the TOBT, TIBT etc. referring to the current time moving window with color coding, with markers in the time scale and compared against FMS plans. This enables the pilot to reference the A-CDM events that occurred or will occur with respect to time scale and events in a selectable moving current window to make collaborative decisions.

In various exemplary embodiments, the present disclosure describes systems and methods that enable the pilots to scroll through a set of A-CDM events from the cockpit. The AOC datalinks provide data about A-CDM events and are configured in the time scale to display the updates in a selected current time moving a window in the display to the pilot.

In various exemplary embodiments, the present disclosure describes systems and methods that enable the display of time, events and distance scales on PFD and HUD in the cockpit (or on a mobile device connected to the aircraft or other ground aviation systems).

In various exemplary embodiments, the present disclosure describes systems and methods that enable the display of revised ground events and traffics into the display which in turn improves the situational awareness and ensures the safe taxing and flying of the aircraft. The layout of the display can be configured to include a fixed time scale with a 'moving events' with an elapsed time window in PFD and HUD displays.

In various exemplary embodiments, the present disclosure describes systems and methods that enable the PFD to display the bug along-side or adjacent with the current time and the A-CDM events in a GUI of the A-CDM event display assistance system with a predicted time or distance in a timeline setting. The flight crew can re-configure the display to select parameters such the time, events, distance slice to view A-CDM events in detail during phases of ground operations such as taxi operations. In addition, for further embedded operations and less display clutter, a configuration of the display may include a time scale that pops up only when there is action occurring or about to occur thereby not cluttering the PFD/HUD.

In various exemplary embodiments, the present disclosure describes systems and methods that enable the displays to show in a priority scheme or timeline of all the A-CDM ground events at the start of a descent, and during an approach by the aircraft so as to predict or gain further situational awareness in advance of a predicted or an expected ground delays for an A-CDM event scheduled in inbound, turnaround and outbound operations of the flight.

In various exemplary embodiments, the present disclosure describes systems and methods that enable alternate configurations of displays to show time representation in VSDs (and similarly in LMAPs) for active flight A-CDM events.

In various exemplary embodiments, the present disclosure describes systems and methods that enable the displays of time scales of A-CDM events when in-air and in-flight and further to display the A-CDM event information of the gate and ground traffic information in a selected current time window while landing, to display A-CDM related rendezvous points for air-to-air refueling or during flight planning, to display entry into no-fly zones or free route airspace; to display entry into spaces where sudden events like volcano eruption affected areas, war or battle zones, rocket launch windows or space events etc.; to display representation in the time in VSD for meeting; to alert time based events such as projected flight durations, separation time adherence by the aircraft, active airspace time etc.; and to display notifications to remind the pilot for actions like changing or quitting the current altitude per ATC instructions.

In an exemplary embodiment, the HONEYWELL® GODIRECT™ Services can be configured to provide enhanced flight optimizations and for presenting A-CDM event data to pilots on particular flight segments or when approaching airports. The HONEYWELL®'s "Single Pane of Glass Cockpit Operations" (SPOG) with the HONEYWELL GODIRECT™ Ground can provide seamless support, integration and use of the A-CDM display assistance application system described herein. All the ground operations using this unified platform will eventually be part of the cockpit display. Hence, all ground operational events pertaining to airport A-CDM events can be conveniently presented to the pilot allowing more decision making on the part of the pilot with respect to ground operations. As an example, for use in conjunction with the A-CDM display assistance application, HONEYWELL's GODIRECT™ Flight Efficiency software can provide data analysis that empower pilots to optimize fuel efficiency across flight operations, and ground operations; and HONEYWELL's connected aircraft solutions can focus on fetching ground events data on to cockpit displays.

The set of A-CDM events can be characterized or defined as a set of objectives to enhance predictability in inbound, turnaround and outbound operations to achieve the following: to improve on-time performance reduce ground movement costs, to optimize/enhance use of ground handling resources; to optimize/enhance use of stands, gates and terminals; to optimize the use of the airport infrastructure, to reduce congestion; to reduce air traffic flow management (ATFM) slot wastage; to provide a flexible predeparture planning; and to reduce apron and taxiway congestion.

The A-CDM event of TOBT (Target Off-Block Time) is relevant to achieving outbound goals, and can be monitored in the A-CDM display assistance application. It is characterized or defined as a point in time objective (i.e. milestone) which is collaboratively monitored and confirmed by the airline/handling agent at which the following goals have been achieved: the ground handling process is designated as concluded, all the aircraft doors are closed, all the passenger boarding bridges have been removed from the aircraft, and a start-up approval and push-back/taxi clearance can be received by the aircraft. In general, all the ground handling processes during an outbound operation, except for the push-back and the de-icing operations of the aircraft, are based on the TOBT milestone.

FIG. 1 illustrates a timeline diagram of an inbound, turnaround, and outbound A-CDM events for the gate to gate flight operations of the A-CDM event display assistance system, in accordance with an embodiment. The A-CDM events are characterized in a set of one to sixteen A-CDM events in FIG. 1 which represent a set of milestones of operations (mutually agreed to by a significant number of commercial carriers and airports worldwide) that relate to A-CDM events in the inbound, turnaround and outbound operations that provide a roadmap to the flight crew of a set of objectives to be realized during the ground operations. By generating this list of sixteen A-CDM events, the situational awareness of the flight crew is improved and allows for the flight crew to track the progress of an aircraft flight in the cockpit from the initial planning stage, from the departure gate to the take-off and from landing to the arrival gate. These sixteen A-CDM events can be incorporated into the time scale with the current time moving window of the A-CDM display assistance system for view on the cockpit display in progression or tracking of aircraft flight.

By instigating a collaborative process in the pre-departure sequence, the departure sequence and the arrival sequence of A-CDM events in the outbound, turnabout and inbound of A-CDM events provides a sequence of necessary airport operations taking into account ground personnel preferences and operational constraints. The A-CDM timeline in adverse conditions achieves collaborative management of an A-CDM event in an airport during periods of predicted or unpredicted reductions of capacity.

The collaborative management, as an example can include, the tracking of inbound flights and the progress of the turn-around process once docked at the gate. For that purpose, European air traffic control prescribes the deployment of 16 milestones, covering a substantial part of a flight's trajectory into an airport and back out of it. Each A-CDM event has timestamps that can be made available by the stakeholders who have confirmed to be the respective source of the data reporting over each milestone. Target off-blocks time (TOBT), which advises the airport community on the departure readiness of an aircraft. It can originate from various sources, depending on the stage of the turn-around process and can range from a calculated airport operator value based on estimated arrival and minimum turn-around time (MTT), or manually updated by the airline (AO) or the handling agent (GH) to reflect the operational situation.

Collaborative decision making input on the part of the pilot can occur as an example in the Target start-up approval time (TSAT), 'in reply' to the TOBT A-CDM event, which of course considers the TOBT, takes Air Traffic Flow and Capacity Management (ATFCM) restrictions into account and establishes the airport's pre-departure sequence. The TSAT management is currently mostly an exclusivity of the Air Navigation Service Provider (ANSP) but with the A-CDM display assistance application, the pilot can gain visibility in the TSAT and provide input to management of the time based milestone in the process flow.

Further with respect to FIG. 1 there is shown in a timeline the sixteen A-CDM events that are implemented in the A-CDM event process at an airport and are as follows: ATC flight plan activation for outbound milestone 5, Estimated off block time (EOBT)—2 hr milestone 10, take-off outstation milestone 15, local radar update milestone 20, final approach milestone 25, landing milestone 30, in-block milestone 35, ground handling start milestone 40, update TOBT prior to TSAT milestone 45, TSAT issue milestone 50, start boarding milestone 55, aircraft ready milestone 60, start-up request milestone 65, start-up approved milestone 70, off-block milestone 75, and take-off milestone 80. As depicted in Table 1.0 below, the A-CDM events depicted in FIG. 1. are defined in a time sequence or schedule as follows:

|   | milestone | Time Reference |
|---|---|---|
| 1. | ATC Flight Plan Activation | 3 hours before EOBT |
| 2. | EOBT - 2 hr | 2 hours before EOBT |
| 3. | Take off Station | ATOT from outstation |
| 4. | Local radar update | Varies according to airport |
| 5. | Final approach | Varies according to airport |
| 6. | landing | ALDT |
| 7. | in-block | AIBT |
| 8. | Ground handling starts | ACGT |
| 9. | TOBT update prior to TSAT | Varies according to airport |
| 10. | TSAT issue | TOBT - 30 mins. To 40 mins. |
| 11. | Boarding starts | Varies according to airport |
| 12. | Aircraft ready | ARDT |
| 13. | Start-up request | ASRT |
| 14. | Start-up approval | ASAT |
| 15. | Off-block | AOBT |
| 16. | Take-off | ATOT |

The above 16 A-CDM events can be configured into the time scale with the current time moving window of the A-CDM display assistance application for the pilot of monitor and collaboratively provide input to each of the events via voice communications or by inputs using a graphic user interface of the A-CDM display assistance application.

Figure 2:
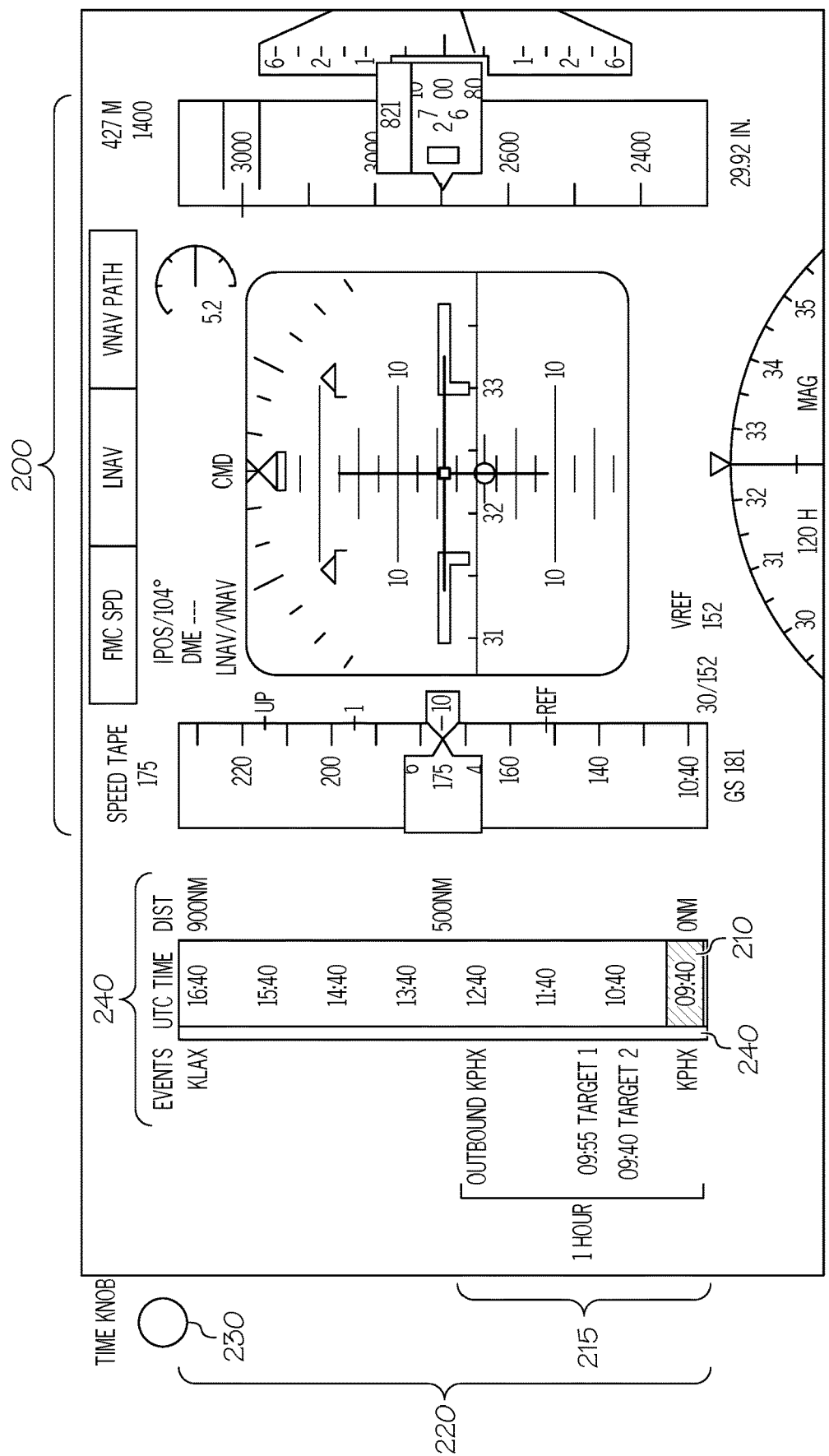
FIG. 2 illustrates an exemplary diagram of a graphic user interface (GUI) with a time scale and a moving current window of the A-CDM event display assistance system in accordance with an embodiment.

FIG. 2 illustrates an exemplary diagram of a graphic user interface (GUI) with a time scale and a moving current window of the A-CDM event display assistance system in accordance with an embodiment. In FIG. 2, the time scale 240 includes references to time, distance and A-CDM events in coordination with a current time moving window 210 and is adjacent to a PFD 200.

Briefly, the Primary Flight Display or PFD 200, found in an aircraft equipped with an Electronic Flight Instrument System, is the pilot's primary reference for flight information. The unit combines the information traditionally displayed on several electromechanical instruments onto a single electronic display reducing pilot workload and enhancing Situational Awareness. The layout and information displayed on the PFD 200 vary depending upon manufacturer and installation. However, most Primary Flight Displays are configured with a central attitude indicator (AI) and flight director surrounded by other flight parameters. Convention normally places the airspeed tape on the left side of the AI and the altitude and vertical speed reference on the right. Vertical deviation for ILS glideslope or VNAV (vertical navigation) is displayed to the right of the AI while lateral deviation from the ILS, VOR or FMS track is displayed below the AI. A compass reference is provided at the bottom of the instrument while, in most cases, flight director, approach, autopilot and auto-throttle modes are annunciated across the top of the instrument.

In FIG. 2, PFD 200 display system is coupled to control module (not shown) and is configured to generate a graphic user interface (GUI) 220 (i.e. Crew Interface configurable to various displays independent or integrated with aircraft systems) which includes the list of A-CDM events with a time scale 240 that is substantially of a similar height as the adjacent VNAV/LNAV image of the PFD 200. The time scale 240 is configured with time demarcations from top to bottom to visually display in real-time each A-CDM event correlated with a set of attributes of the A-CDM event which include one or more of: A-CDM identifiers, start/stop times, distances, time periods, and elapsed times of duration. The set of attributes continuously transitions to provide enhanced visual situational awareness in the cockpit display to a current aircraft trajectory and state during the departure or arrival. The transitions are incrementally increased or decreased in real-time by highlights or color; and a notification between the pilot and the ground personnel of a set of collaborative communications back and forth of at least one or more selections of A-CDM events which occur in a present or in a near future while the aircraft is at the airport using the GUI 220 which displays the list (which may be a predetermined configured list) in order to modify or skip A-CDM events where the ground personnel and the pilot provide each collaborative notifications of the selections on the GUI 220.

In FIG. 2, in an exemplary embodiment, the GUI 220 is a scaled graph of time periods that show a timeline and corresponding A-CDM events in the timeline. Hence, a pilot upon viewing the GUI 220 will view a list of A-CDM events (of FIG. 1) in a time-dependent order. The current time is designated by a current time moving window 210 for a flight labeled "KPHX". As the user manipulates the time knob 230, the current time moving window 210 with respect to the time scale 240 is changed for a selected time period 215 (i.e. expanded or decreased in size). The time knob 230 may be configured as an analog device (i.e. solenoid device) that sends electrical signals by manipulating the time knob 230 in a clockwise or counterclockwise to either increase or decrease a time period displayed by the GUI 220 and in turn show more details in a particular time period. Further, the time knob 230 may be configured as an in-app module, graphics module and is not limited to a hardware configuration but can be a "software" type selector knob integrated or overlaid with the GUI 220 in multiple display types. That is the implementation of the time knob 230 can allow for configuration with inputs available, alternate input devices for HUD displays, wearable devices and the like and is not limited to an additional hardware device. For example, a 1 hour time period 215 of a current time moving window 210 is displayed with A-CDM event data within the 1 hour time period 215 identified by the current time moving window 210. The current time moving window 210 is configured in part in response to aircraft flight plan data and sensor data from various aircraft systems (not shown). As an example, the user may choose to see further details in the 1 hour time period 215 of the current time moving window 210 by manipulating the time knob 230 in one direction or choose to view less details in the 1 hour time period 215 of the current time moving window 210 by manipulating the time knob 230 in the alternate direction. By performing a selection of a time period 215 and by using the current time moving window 210 in the selection and then by turning the time knob 230 in either the clockwise or counter-clockwise direction, the user can view more or less of the activities of A-CDM events in the time scale 240 (i.e. in the current time moving window 210) displayed in the GUI 220. While the present disclosure describes the use of time knob 230 to increase or decrease time periods 215 of the current time moving window 210 in the GUI 220, it is contemplated that a variety of user input selectors can be configured to adjust the time periods 215 (i.e. increase or decrease the amount of time) of the current time moving window 210 in the GUI 220 and the disclosure is not limited to the particular configuration of a time knob 230 for making changes to a displayed time period 215 of the current time moving window 210.

In addition, the GUI 220 is configured to be adjacent to PFD 200 in a seamless manner so the pilot in a field of view, can view both the PFD 200 and the GUI 220 to monitor the current aircraft state and the current or future A-CDM events in tandem to increase situational awareness of the pilot with respect to the aircraft state and progression of the set of A-CDM events (See FIG. 1) to be achieved. Also, the GUI 220 may be configured to be selectively displayed to notify the pilot of A-CDM events in the time scale, or configured to notify the pilot of predicted A-CDM events as desired.

In various exemplary embodiments, the GUI 220 of A-CDM events may be configured for display in other displays or mobile connected displays. The list of A-CDM events displayed can be configured to be synced with other displays of such events viewed by ground personnel. Hence, with the synced list of A-CDM events, the pilot can collaboratively cross communicate about a selected A-CDM event with ground personnel or even make selections to skip or indicate a completion of a particular A-CDM event via the GUI 220. In this manner, the pilot can increase the efficiency of the completion of the A-CDM events for each phase of inbound, turnabout and outbound operations and meet the requisite TOBT projection. The pilot by using GUI 220 with the time knob 230 can access and view data of activities performed by ground personnel to achieve each A-CDM milestone. Further, the pilot can act the decision maker and point of communication to make decisions of completion of each A-CDM event, an interaction with ground personnel to verify or ensure completion of A-CDM events and can communicate decisions via the GUI 220 to a variety of ground personnel such as the ATC and baggage handlers.

In various exemplary embodiments, a collaborative decision making can be communicated by pilot inputs to the A-CDM event display assistance system (i.e. via the time knob 230 or other input means) that can be viewed by the ground personnel in real-time. For example, the pilot may send using various input device requests for status updates or receive audio notifications of activities completed and is able to indicate a completion of activity within the current time moving window 210 so that an A-CDM event can be achieved and the flight progression of the aircraft is not delayed.

Figures 3A, 3B, 3C:
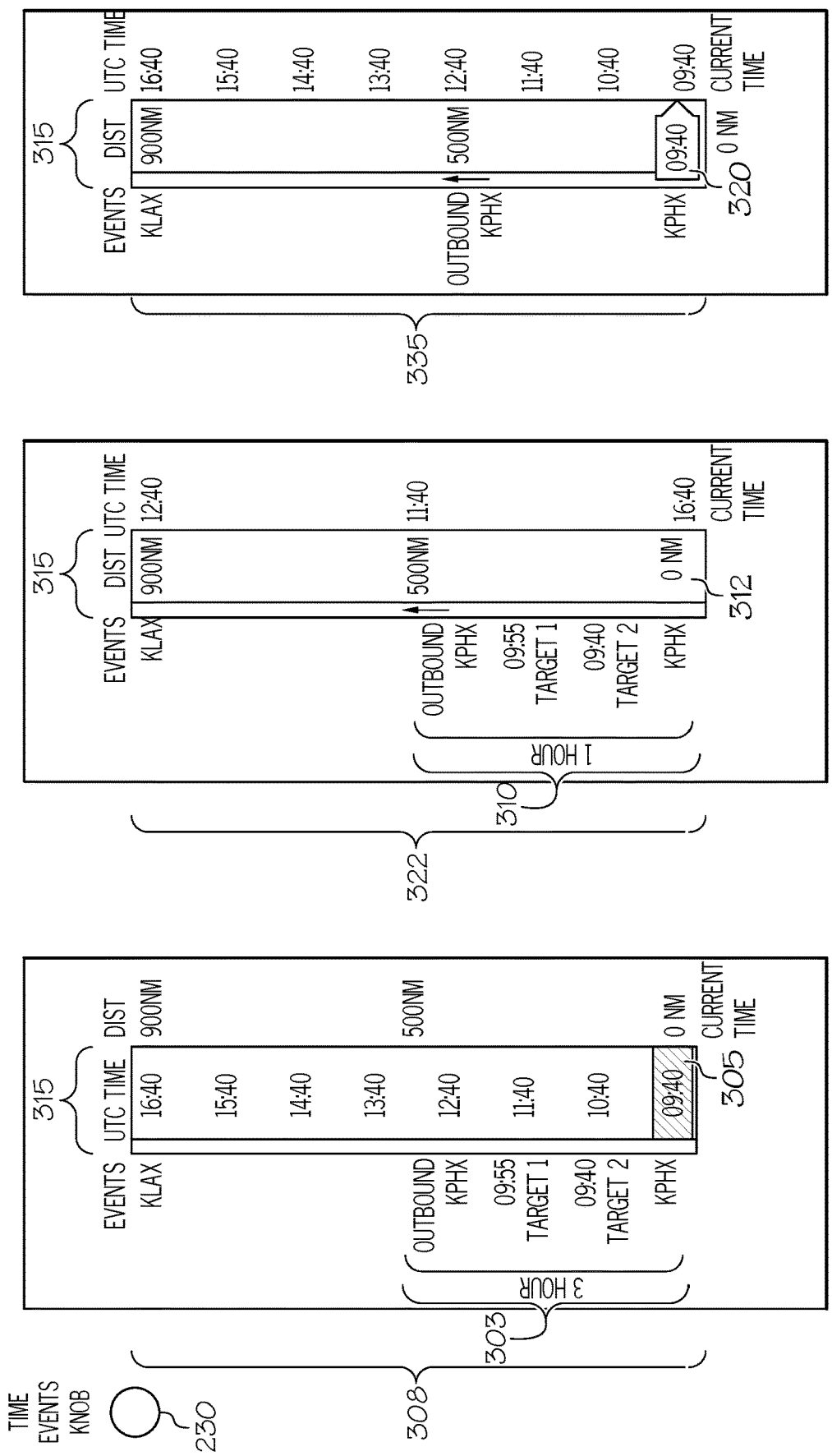
FIGS. 3A-3C illustrate exemplary diagrams of the activities of each A-CDM event in time scales with current time moving windows of the A-CDM event display assistance system in accordance with an embodiment.

FIGS. 3A-3C illustrates the activities of each A-CDM event at the various time scale of the A-CDM event display assistance system in accordance with an embodiment. The user manipulates the time knob 230 in a clockwise or counterclockwise direction to increase or decrease a time scale and to move up or down a moving window in a range of time in each time scale between the two A-CDM events labeled "KLAX" and "KPHX" of FIGS. 3A-3C. For example, in FIG. 3A an exemplary full scale time 308 with the current time interval 303 of 3 hours is shown with the moving window 305 presented within the current time interval 303. The moving window 305 is configured with an opaque or black background for embedding or overlaying into the time scale 315. The moving window 305 can select one of a set of activities between "9:40" to "12:40" of the current time interval 303 by using the time knob 230 to move the moving window 305 up or down within the time scale 315. The user (ex. pilot, ground personnel etc.) can make selections to skip or change using the time knob 230 or other inputs (not shown) activities in the current time interval 303.

In FIG. 3B, the moving window 312 is a reference to the items in the time interval 310 and is adjusted by the time knob 230. In FIG. 3B, the exemplary scale diagram shows a half scale 322 for a selected time interval 310 of one hour is shown. The remainder of the half-scale 322 shows the remaining flight hours from "11:40" to "12:40" to the next A-CDM event "KLAX".

In FIG. 3C, an exemplary diagram of a full flight time scale 335 with a current time in a moving window 320 is shown. The moving window 320 is configured in the full flight time scale 335 from "9:40" to "16:40" in FIG. 3C by manipulation of the time knob 230. The user can manipulate the time knob 230 to change the moving window 320 with respect to the full flight time scale 335 as desired and also can configure the full flight time scale 335 to include any proportionate scale and is not limited to the half or full scale. That is, the adjustments can be made on an incremental basis, to enlarge or decrease time scale and the range of move in time steps of the moving window 320 from a time scale of a de-minus size to the entire full flight time scale 335. The moving window 320 is configured with a light or white background to contrast against the time scale 315 and the surrounding opaque background, and in additional to allow for easy visual identification by the pilot or other viewer on the cockpit display. While only two A-CDM events of "KLAX" and "KPHX" in the outbound KPHX time scale in FIGS. 3A to 3C, it is contemplated that additional flight phases may be included such as inbound and turnaround flight operations that would result in more A-CDM events being made visible or presented in the full flight time scale or segments displayed on the flight time scale.

Figure 4B:
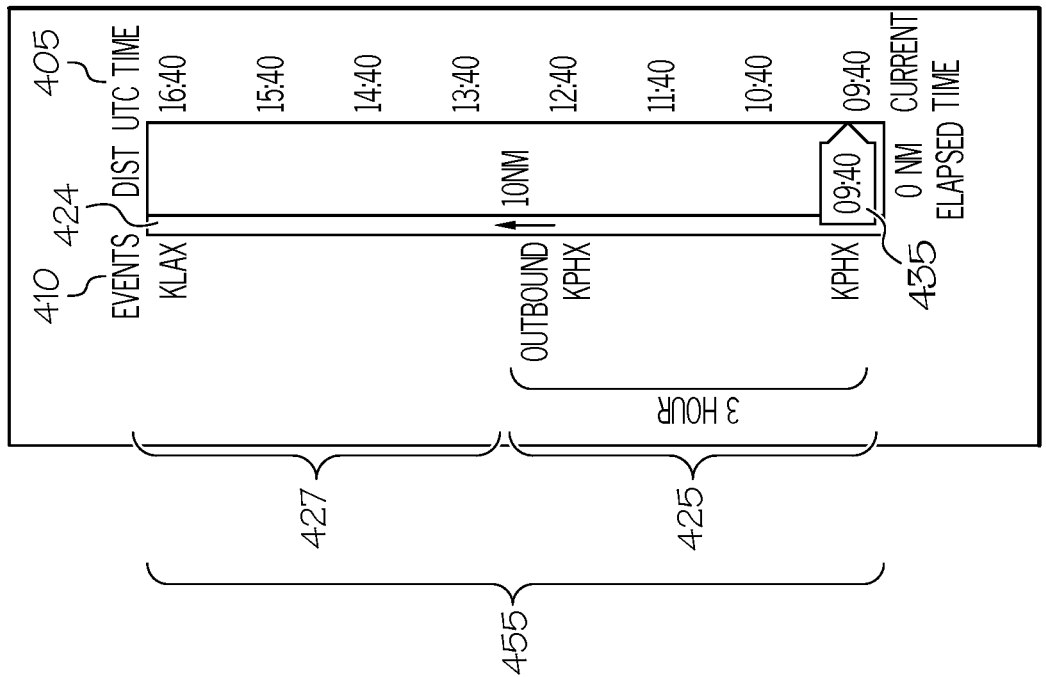
FIGS. 4A and 4B illustrate exemplary diagrams of time scales with current time moving windows of graphic user interfaces for the A-CDM events with different selected time scales, in accordance with an embodiment.
Figure 4A:
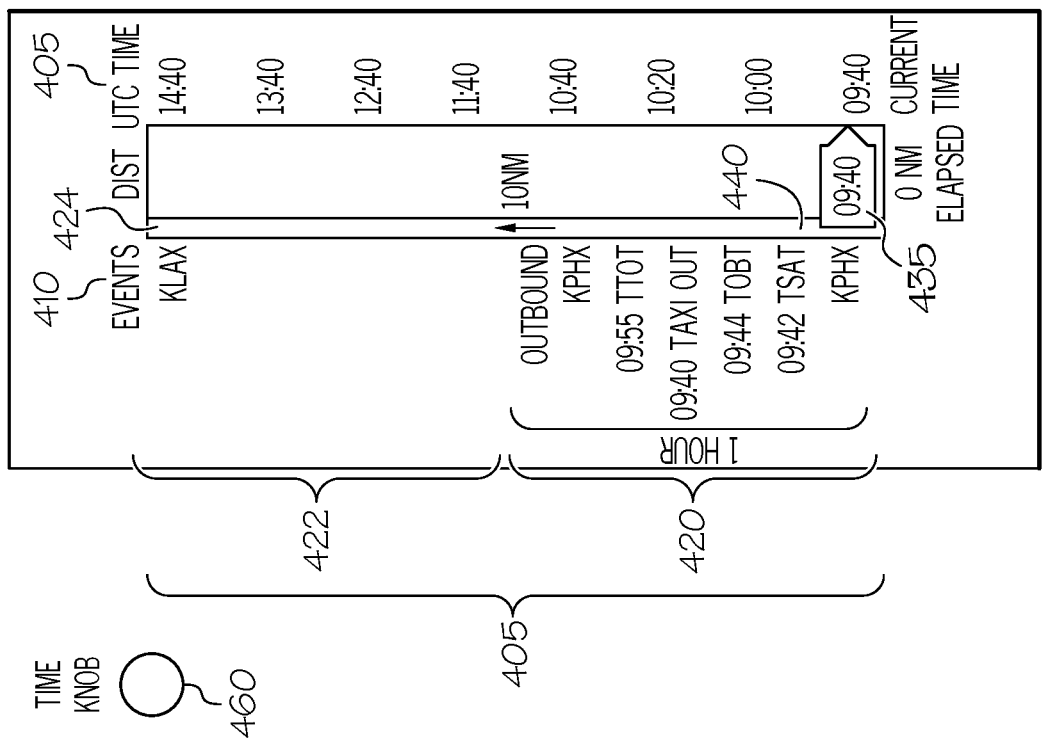

FIGS. 4A and 4B illustrate diagrams of time scales of graphic user interfaces for the A-CDM events with different selected time scales, in accordance with an embodiment. In FIG. 4A, the time scale 400 is selected for a time interval 420 of one hour fixed and is configurable or adjustable by the user (i.e. the pilot) and the remainder of the time scale of the time interval 422 with the remaining flight hours with the current time moving window 435 with a white background appearance to contrast against the darker background of the time scale 400 and the surrounding opaque background of the display. The entire flight time scale 405 of the flight is shown for a period from with timestamp "9:40" for A-CDM event "KPHX" to the next A-CDM event "KLAX" with time stamp "14:40". The entire flight time scale 405 is half scaled into a one-hour time interval 420. The time scale 400 is adjusted in a linear manner by the input time knob 460 which can either be manually toggled to increase or decrease the time period in relation to the entire flight time scale 405 and to adjust the time scale 400 within the graphic user interface 424. That is, the size and distance of the time scale or time period in the graphic user interface 424 can be decreased to accommodate more A-CDM events or to accommodate less A-CDM events. Further, the current time moving window 435 (i.e. reference to a period of the time) of the entire flight time scale 405 can be expanded in range to show A-CDM events in a time period displayed of the time scale 400 which is the entire range of current time moving window 435. The current aircraft state is shown at current time moving window 435 that indicates a reference point to determine from a current A-CDM event "KPHX": the next A-CDM event, the predicted time in real-time for the next events, and as the time interval 420 (i.e. time period) enables a smaller segmented view of the time scale 400 to show a list of coming A-CDM events. Further, the bar graph 440 visually depicts the progress by movement of the current time moving window 435 up the time scale 400 of completion of the current A-CDM event and the time of completion of the subsequent A-CDM events cumulating in the completion of the flight.

The time interval can be expanded by the time knob 460 to show more or less A-CDM events in the graphic user interface. As the time periods are decreased in scale, only high-level events are depicted and as the time period are increased in scale, the graphic user interface can display more A-CDM events in each time period as there is more space on the time scale to show multiple events as scaled in a correct time sequence.

The pilot manipulates the time knob 460 at any given time to change the time scale to view more A-CDM events over a longer time period, or to drill down to a smaller time interval close and allow an expanded range in the smaller time interval of the current time moving window 435 to see more details of A-CDM events in a lesser time interval. Hence, the time knob 460 allows the pilot or viewer to see a high level of A-CDM events across a larger time period, and to manipulate the time knob 460 to view A-CDM events over a narrower time period. This enables the viewer's situational awareness of upcoming A-CDM events to improve and further to predict the time required for the completion of an A-CDM event.

The current time moving window 435 represents the active trajectory of the aircraft at a time, in this case, an outbound trajectory beginning at "9:40" to "14:40" and the graphic user interface illustrates a list of generated A-CDM events that occur in the time scale displayed. The data for the A-CDM events are processed by a processing module (not shown) from data from airport ground operations data, from a table of the predetermined list of A-CDM events generated for the embarkation or arrival airport, and from aircraft sensor data of the aircraft current aircraft state data and active trajectory. The processing module continuously updates the listed A-CDM events in the predetermined list on the graphic user interface 424 with current ground operation data.

If the pilot chooses, the pilot can change the location of the current time moving window 435 (in which case would not represent the current time) to view A-CDM events in relation to a new position of the current moving time window on the time scale, and each time the current time moving window 435 is moved up or down by the pilot input, the time scale and current moving time window is adjusted to show on the graphic user interface 424 as much of the time period as possible for enhanced situational awareness to the pilot from the current aircraft state.

In FIG. 4B, there is illustrated a diagram of a half time scale 455 selected over a time interval 425 of three hours while the remainder of the time scale 427 with the remaining flight hours with the current time moving window 435 with the white background. Like FIG. 4A, the user can adjust by the time knob 460 the time scale by adjusting the current time moving window 435 and also adjust the time interval 425 to expand or decrease a region of interest on the half time scale 455.

FIGS. 5A and 5B illustrate graphic user interfaces for comparison of A-CDM events, in accordance with an embodiment. In FIGS. 5A and 5B a color-coded segment is displayed in the current moving time window in the time scale to show visually the predicted time periods for each A-CDM event. For example, in FIG. 5A, the graphic user interface includes the time interval 505 includes a series of A-CDM events 515 and a color coded segments 535 which relate to each A-CDM event. The color-coded segment 535 gives a visual indication of the length in time in accordance with the demarcations of time in the time scale 500 display of the time interval 505. The current time moving window 540 can point to a time on the time scale 500 that can be visually correlated to one of the color coded segments 535. Hence, the pilot by looking at the color-coded segments 535, can match a segment (ex. red segment 520, yellow segment 525, and green segment 527) to the current time moving window 540 and easily gauge the remaining amount of time in the colored segment to complete the A-CDM event. In addition, by the length of each color coded segment the amount of time for the particular A-CDM event in relation to the entire flight time as displayed in the time scale 500 can be easily seen. For example, the "TTOT" A-CDM event corresponds to the red segment 520 which is greater than the "TAXI OUT" A-CDM event which corresponds to the yellow segment 525 which in turn is greater than the "TOBT" event which corresponds to the green segment 527.

In FIG. 5B, on the time scale 500, the viewer can gauge a time period that overlaps a series of color coded segments, in this case a 15 minute time interval 55 than begins at the current time moving window 540 and ends after the "TOTT" A-CDM event. In this case, the pilot can determined if there is a delay in an earlier A-CDM event, and can visually see or calculate an offset that occur will in a later A-CDM event. With this convenient notification, the pilot can plan and in collaborate communicate with ground personnel decide actions or make decisions to compensate for the earlier delay by changing or modifying an A-CDM event time occurring later in the outbound flight operation to enable a more expedite completion.

Figure 6:
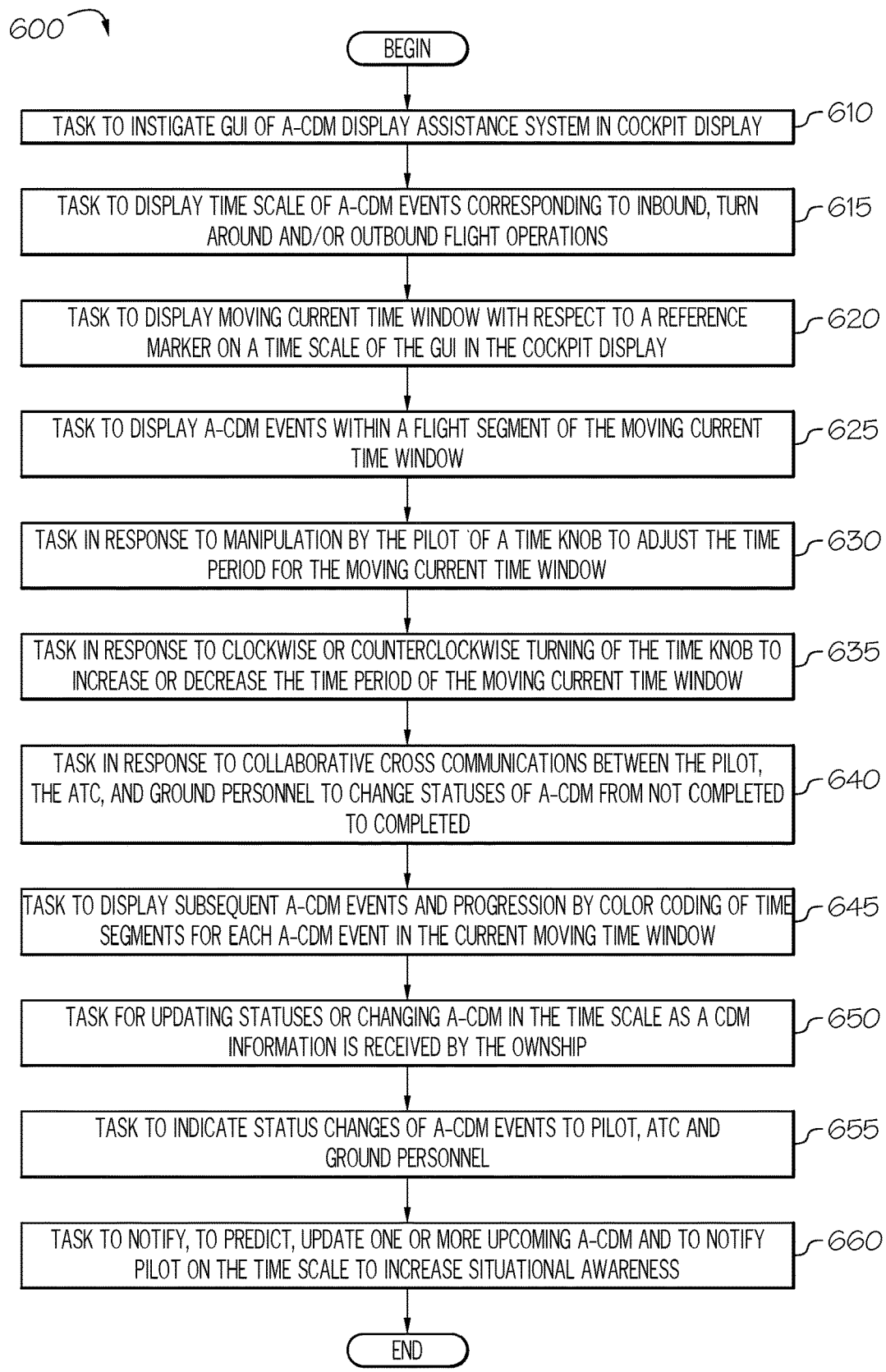
FIG. 6 is a flowchart of using the time scale with current time moving window for collaborative decision making by cross communications between the pilot and ground personnel for completion of one or more A-CDM events in the time displayed by the A-CDM event display assistance system in accordance with an embodiment.

FIG. 6 is a flowchart of using the time scale with current time moving window for collaborative decision making by cross communications between the pilot and ground personnel for completion of one or more A-CDM events in the time displayed by the A-CDM event display assistance system in accordance with an embodiment. In the flowchart of FIG. 6, at task 610, a graphic user interface is instigated on a cockpit display of the A-CDM display assistance system when an action is warranted by the pilot or when the pilot selects to execute an APP of the A-CDM display assistance system for situation awareness of upcoming, current or predicted A-CDM events during various flight phases. At task 615, the APP of the A-CDM displays assistance system displays in a cockpit display a time scale with a current time moving the window covering one or more A-CDM events related to flight phases of the inbound, turnaround and outbound flight operations. At task 620, the current time moving window is displayed in a default setting (i.e. with an opaque background) with a list of A-CDM event in graphic user interface that enables the pilot in a simulated view gain situation awareness of a current A-CDM event with respect to the current state of the aircraft or if in-air, the current path progression of the aircraft. At task 625, the flight segments are correlated on the current time moving window for positional awareness to the pilot of the A-CDM event and related information. This enables the pilot to make collaborative decision making with the ground personnel of a particular A-CDM event and to cross communicate with the ground personnel including the ATC, baggage handlers, maintenance workers, flight personnel etc. to predict, skip, decide a completion or not completion of a particular A-CDM event. At task 630, the pilot can manipulate the time knob in a clockwise or counter-clockwise direction to change, adjust, narrow or increase the time period or range of the current time moving window in relation to the time scale displayed in the graphic user interface in the cockpit display to drill in or view at a higher level data of one or more A-CDM events. At task 635, in response to the clockwise or counter-clockwise turning of the time knob, the time period in the current time moving window is narrower or increased as desired by the pilot. In this manner, the pilot by using the time knob can select times, events and distance scales on the PFD and HUD and sliced views of operations during flight phases (i.e. taxing etc.). At task 640, the pilot can make cross communications between the ATC and ground personnel and essential act as the key decision making by focusing in on various A-CDM events. Further, the pilot can monitor closely critical times in the time scale using different ranges of the current time moving window of A-CDM events or seek out critical times for the TOBT, TIBT, etc. In addition, at task 645 the pilot using the color coding segments in the current time moving window can conveniently seek out critical times of TOBT, TIBT etc. events that have been highlighted by the color markers enabling the pilot to measure the length of times on the time scale easily. At task 650, the A-CDM events can be updated during the ground operations or in-air. For example, in-air the updates can be extended to display gate information, ground traffic information, entry into no flu zones, free route airspace, remind the pilot of altitude corrections, remind the pilot of cold weather restrictions etc. At task 655, the status changes can be alerted to the pilot as a pop-up of the time scale in-air or on the ground. At task 660, predictions of future delays in A-CDM event or upcoming A-CDM events can be provided on the time scale with the current time moving window in an automated manner without the pilot needing to make selections by using the time knob. In addition, A-CDM events can be represented in VSD cockpit displays for notification of active flight events to the pilot in-air.

Figure 7:
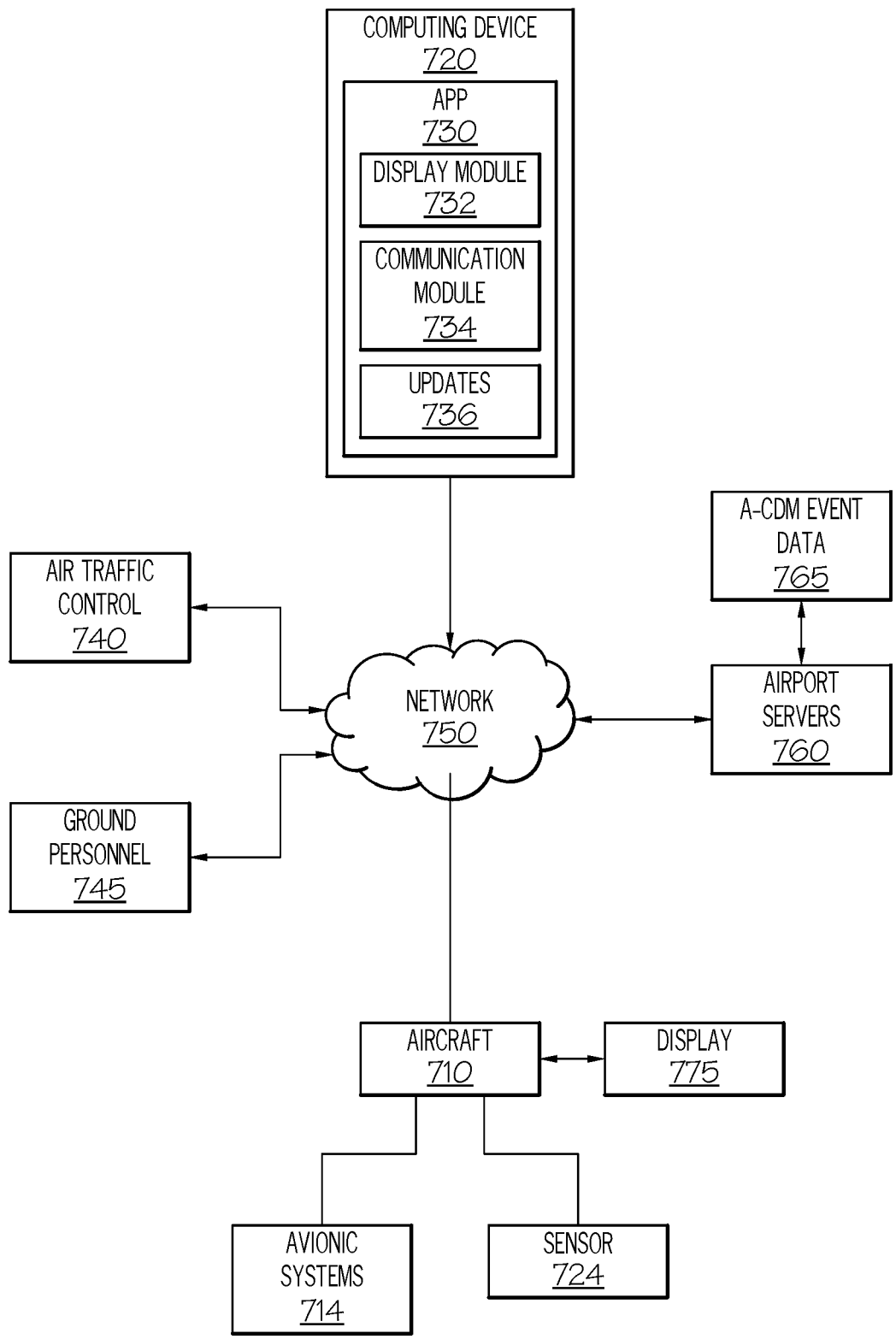
FIG. 7 is an exemplary diagram of a network configuration for connecting the A-CDM display assistance system to generate the time scale with the current moving time window for a set of A-CDM events to display in an aircraft cockpit in accordance with an embodiment.

FIG. 7 is a diagram of a network configuration for connecting the A-CDM display assistance system to generate the time scale with the current moving time window for a set of A-CDM events to display in an aircraft 710 cockpit in accordance with an exemplary embodiment. In FIG. 7 the network 700 may include, without limitation, a computing device 720 configured to host an APP 730 to execute an application to instigate the A-CDM event display assistance system with a time scale and current time moving window. The APP may include: a module 732 for displaying the time scale with the current moving time window displaying one or more A-CDM events for a flight path of an aircraft 710, a module 734 that communicates with one or more avionics systems onboard the aircraft 710 and to ground personnel (i.e. aerodrome controllers, baggage handlers etc.), and a module 736 for displaying updates to the time scale and for sending and receiving messages between the aircraft and ground personnel related to A-CDM events. The APP 730 may reside on a client of the computing device 720 (which can be integrated with various avionic systems 714, aircraft sensors 724 etc.) and can be connected to a cockpit display 775 for displaying the time scale and the current time moving window with real-time references and simulation of flight progress towards one or more A-CDM events. The APP 730 can receive inputs from multiple parties, sensors 724 and even from published data for analysis and configuration in the display with A-CDM events displayed. The network cloud 750 can be coupled to at least one server system 760, air traffic control (ATC) 740, ground personnel 745 and the aircraft 710. In practice, certain embodiments of the network 700 may include additional or alternative elements and components, as desired for the particular application.

The computing device 720 may be implemented by any computing device that includes at least one processor, some form of memory hardware, a user interface, and communication hardware and may be separate or integrated with the aircraft 710. For example, the computing device 720 may be implemented using a personal computing device, such as a tablet computer, a laptop computer, a personal digital assistant (PDA), a smartphone, or the like. In other embodiments, the computing device 720 may be implemented or integrated into a computer system onboard the aircraft 710.

The aircraft 710 may be any aviation vehicle which has inbound, turnaround and outbound types of flight mode operations that require achieving one or more milestones of A-CDM events when arriving or departing a destination. The aircraft 710 may be implemented as an airplane, helicopter, spacecraft, hovercraft, or the like. The one or more avionics systems 714 may include a Flight Management System (FMS), crew alerting system (CAS) devices, Automatic Dependent Surveillance-Broadcast (ADS-B), Controller Pilot Data Link Communication (CPDLC), navigation devices, weather radar, aircraft traffic data, and the like. Data obtained from the one or more avionics systems 714 may include, without limitation: aircraft characteristics, performance tables, weather data, or the like.

The server system 760 may include any number of application servers, and each server may be implemented using any suitable computer. In some embodiments, server system 760 includes one or more dedicated computers. In some embodiments, the server system 760 includes one or more computers carrying out other functionality in addition to server operations. The server system 760 may store and provide any type of data (i.e. a-CDM event data 765) used to, for example, proprietary algorithms and performance tables used in the approach, ground operations, and departure of the aircraft.

Figure 8:
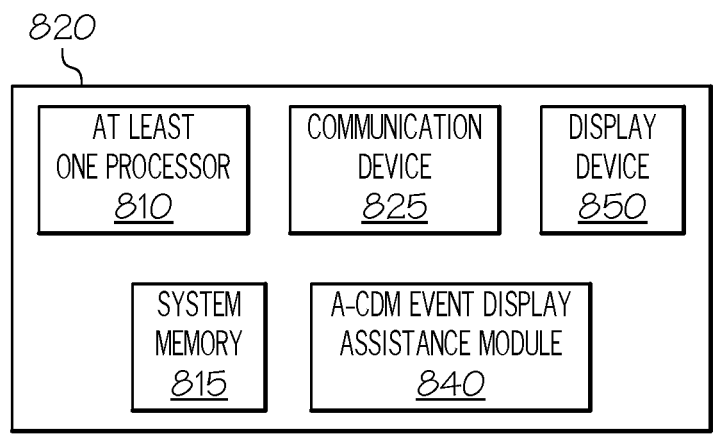
FIG. 8 is an exemplary block diagram of an architecture of a system 800 for providing A-CDM event assistance by displaying A-CDM related data for cross communications and decision making by the pilot and the ground personnel during an approach, arrival, turnaround, and departure of an airport in accordance with an embodiment.

FIG. 8 is a block diagram of an architecture of a system 800 for providing A-CDM event assistance by displaying A-CDM related data for cross communications and decision making by the pilot and the ground personnel during an approach, arrival, turnaround, and departure of an airport in accordance with various exemplary embodiments. It should be noted that the computing device 820 can be implemented with the computing device 720 depicted in FIG. 8. In this regard, the computing device 820 shows certain elements and components of the computing device 720 (of FIG. 7) in more detail.

The computing device 820 generally includes, without limitation: at least one processor 810; system memory 815; a communication device 825; an A-CDM event display assistance module 840; and a display device 850. These elements and features of the computing device 820 may be operatively associated with one another, coupled to one another, or otherwise configured to cooperate with one another as needed to support the desired functionality—in particular, providing a time scale of A-CDM events with a current moving time window, for enabling communications to the aircrafts and the ground personnel, for updating A-CDM related data in the time scale during an inbound, turnaround and outbound flight operation, providing notifications (i.e. alerts) to flight crews, ground personnel and messages to enable A-CDM decision making by flight crews as described herein. For ease of illustration and clarity, the various physical, electrical, and logical couplings and interconnections for these elements and features are not depicted in FIG. 8. Moreover, it should be appreciated that embodiments of the computing device 820 will include other elements, modules, and features that cooperate to support the desired functionality.

The at least one processor 810 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 810 may be realized as one or more microprocessors, controllers, microcontrollers, or state machines. Moreover, the at least one processor 810 may be implemented as a combination of computing devices, e.g., a combination of digital signal processors and microprocessors, a plurality of microprocessors, one or more microprocessors in conjunction with a digital signal processor core, or any other such configuration.

The at least one processor 810 is communicatively coupled to the system memory 815. The system memory 815 is configured to store any obtained or generated data associated with A-CDM events during an approach, arrival, ground operations and departure by the aircraft. The system memory 815 may be realized using any number of devices, components, or modules, as appropriate to the embodiment. The communication device 825 is suitably configured to communicate data between the computing device 805 and one or more remote servers, one or more avionics systems onboard an aircraft, and air traffic control and/or ground control. The communication device 825 may transmit and receive communications over a wireless local area network (WLAN), the Internet, a satellite uplink/downlink, a cellular network, a broadband network, a wide area network, a radio communication network, or the like.

The A-CDM event display assistance module 840 is configured to communicate with the aerodrome controllers, issue alerts, send messages, and update the A-CDM event data at a destination airport. The display device 850 is configured to display various icons, text, and/or graphical elements in a time scale with a current time moving window during approaches, ground operations and departures at destination airports. In an exemplary embodiment, the display device 850 is communicatively coupled to the at least one processor 810. The at least one processor 810 and the display device 850 are cooperatively configured to display, render, or otherwise convey one or more graphical representations or images associated with the various approach flight steps, intermediate flight steps, ground operation steps, departure steps and series of A-CDM events on the display device 850.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits.

It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic is shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit including custom VLSI circuits or gate arrays, offthe-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for time-based viewing to coordinate airport collaborative decision making (A-CDM) events between a pilot and ground personnel on an interface configurable for display on multiple types of cockpit displays of an aircraft, the method comprising:
   generating, using a computing device that has at least one processor programmed to implement an application hosted by the computing device, a time scale with a list of A-CDM events of the aircraft during inbound, turnaround and outbound flight operations to an airport based on a first component of sensor data contributed by aircraft systems and based on a second component of data of A-CDM event related to airport operations wherein the first and second components are used to generate a current time moving window in the time scale for identifying one or more A-CDM events;
   receiving sensor data to the at least one processor from at least one sensor system deployed on the aircraft;
   associating a memory to the at least one processor for storing the list of A-CDM events related to the airport operations;
   executing, by the at least one processor, the application to generate a graphical user interface (GUI) using the sensor data for positioning the current time moving window on the time scale for display on a cockpit display; and
   collaboratively communicating, by communication devices coupled to the at least one processor with ground personnel, decisions based on an aircraft state and a current A-CDM event identified by the positioning of the current time moving window in the time scale to expedite completion of a particular A-CDM event.

2. The method of claim 1, further comprising:
   notifying, by a pop-up of an A-CDM event on the time scale on the cockpit display, an action related to the A-CDM event identified by the positioning of the current time moving window; and
   notifying, by another pop-up of the A-CDM event of the time scale, while in-air of a status change in any upcoming A-CDM events in a flight on the cockpit display.

3. The method of claim 1, further comprising:
   adjusting a selector knob to change a time interval for viewing the one or more A-CDM events in the time scale by increasing or decreasing the time interval displayed on the cockpit display; and
   providing, without requiring adjustments to the selector knob, automated interval displays related to predicted future delays in A-CDM events or upcoming A-CDM events in the time scale on the cockpit display.

4. The method of claim 3, further comprising:
   adjusting by the selector knob the time scale to a half flight time scale to enable monitoring of a narrow time interval of A-CDM events of an entire flight in the time scale displayed by the GUI.

5. The method of claim 1, further comprising:
   color coding a segment of the time scale to correspond to an A-CDM event for visual notification on the cockpit display by color of the A-CDM event.

6. The method of claim 1, further comprising:
   notifying decisions of A-CDM events on the time scale by inputs from the selector knob comprising: decisions to skip or decisions to modify a particular A-CDM event.

7. A system for time-based viewing to coordinate airport collaborative decision making (A-CDM) events between a pilot and ground personnel on an interface configurable for display on multiple types of cockpit displays of an aircraft, comprising:
   a source of ground operation data at an airport;
   a source for A-CDM events for generating a list of A-CDM events;
   a source of aircraft state data;
   a source of an active trajectory;
   a display system configured to generate a graphical user interface (GUI) comprising a time scale configured with a moving time window displaying one or more A-CDM events from a list of A-CDM events;
   a control module operationally coupled to receive and process the source of ground operation data, the aircraft state data, the active trajectory, and the A-CDM events, and configured to command the display system to display the list of A-CDM events and to continuously update each A-CDM event in the list with current ground operation data related to operation of the aircraft; and
   a selector knob, responsive to input time interval selections by the pilot, for adjusting the time interval for viewing the one or more A-CDM events by increasing or decreasing the time interval displayed with the moving time window to enable viewing of current A-CDM event information for collaborative decision making communications between the pilot and ground personnel to expedite completion the A-CDM event viewed with the moving time window.

8. The system of claim 7, further comprising:
a display of a full flight time scale, by a selection of the selector knob, to enable monitoring of the time interval of A-CDM events for an entire flight with the moving time window in the time scale of the GUI.

9. The system of claim 8, wherein the moving time window comprises an opaque background to contrast with a display of the time scale.

10. The system of claim 7, further comprising:
a display of a half flight time scale, by a selection of the selector knob, to enable monitoring of a lesser time interval of A-CDM events of an entire flight with the moving time window.

11. The system of claim 10, wherein the moving time window comprises a white background to contrast with a display of the time scale.

12. The system of claim 10, wherein the half time scale selected as the time interval is configurable in the GUI while a remaining part of the time scale is configured with remaining flight hours.

13. The system of claim 7, further comprising:
a segment of the time scale color coded to correspond to a particular A-CDM event for visual notification by color of the A-CDM event in the time scale.

14. A method for time-based viewing to coordinate airport collaborative decision making (A-CDM) events between a pilot and ground personnel on an interface configurable for display on multiple types of cockpit displays of an aircraft, comprising:
receiving ground operation data at an airport;
receiving A-CDM event data for generating a list of A-CDM events;
receiving aircraft state data;
receiving active trajectory about the aircraft;
processing by a control module operationally coupled and configured for receiving the ground operation data, the aircraft state data, the active trajectory, and the A-CDM event data to display a time scale containing a list of A-CDM events in a cockpit display and to continuously update each A-CDM event in the time scale with current ground operation data related to operation of the aircraft;
generating a graphical user interface (GUI) to display the time scale configured with a moving time window presenting one or more A-CDM events from the list of A-CDM events in the cockpit display; and
adjusting a time interval of the time scale by a selector knob for viewing the one or more A-CDM events by increasing or decreasing the time interval with the moving time window to identify a particular A-CDM event in the list for collaborative decision making communications between the pilot and ground personnel about the A-CDM event to expedite a set of task at least comprising: completing, skipping or modifying the A-CDM event for enhance efficiency in the operation of the aircraft.

15. The method of claim 14, further comprising:
displaying a full flight time scale, by a selection of the selector knob, to enable monitoring of all of the A-CDM events for an entire flight with the moving time window in the time scale of the GUI.

16. The method of claim 15, further comprising:
notifying, by a pop-up of an A-CDM event on the time scale on the cockpit display, an action related to the A-CDM event identified by the positioning of the current time moving window; and/or notifying, by another pop-up of the A-CDM event of the time scale while in-air of a status change in any upcoming A-CDM events in a flight on the cockpit display wherein the moving time window comprises an opaque background to contrast with a display of the time scale.

17. The method of claim 14, further comprising:
displaying a half flight time scale, by a selection of the selector knob, to enable identifying a limited time interval of A-CDM events of an entire flight by the moving time window in the time scale of the GUI.

18. The method of claim 17, wherein the moving time window comprises a white background to contrast with a display of the time scale.

19. The method of claim 18 wherein the half time scale selected as the time interval is configurable in the GUI while a remaining part of the time scale is configured with remaining flight hours.

20. The method of claim 14, further comprising:
providing, without requiring adjustments to the selector knob, automated interval displays related to predicted future delays in A-CDM events or upcoming A-CDM events in the time scale on the cockpit display; and
color coding a segment of the time scale to correspond to the A-CDM event for visual notification by color of the A-CDM event in the time scale.

* * * * *